United States Patent
Lee

(10) Patent No.: US 6,674,467 B1
(45) Date of Patent: Jan. 6, 2004

(54) DIGITAL STILL CAMERA WITH IMAGE PREVIEW USING A FIRST AND SECOND MEMORY AND METHOD FOR USING THE SAME

(75) Inventor: Sang-Gi Lee, Changwon-si (KR)

(73) Assignee: Samsung Aerospace Industries, Ltd. (KR)

( * ) Notice: Subject to any disclaimer, the term of this patent is extended or adjusted under 35 U.S.C. 154(b) by 0 days.

(21) Appl. No.: 09/133,745

(22) Filed: Aug. 13, 1998

(30) Foreign Application Priority Data

Aug. 14, 1997 (KR) .............................. 97-38856

(51) Int. Cl.[7] .................................................. H04N 5/76
(52) U.S. Cl. ................................ 348/231.2; 348/333.11
(58) Field of Search ....................... 348/333.11, 333.12, 348/220, 231, 232, 231.2

(56) References Cited

U.S. PATENT DOCUMENTS 5,742,339 A * 4/1998 Wakui ........................ 348/231
6,184,930 B1 * 2/2001 Mitsuhashi et al. ......... 348/231
6,249,316 B1 * 6/2001 Anderson .............. 348/333.05

* cited by examiner

*Primary Examiner*—Wendy R. Garber
*Assistant Examiner*—Matthew L. Rosendale
(74) *Attorney, Agent, or Firm*—Fish & Richardson P.C.

(57) ABSTRACT

An electronic still camera is described which allows previewing the composition of an image before the image is stored. The digital still camera includes at least two release switches; a lens unit; an image pickup unit for converting the optical image into corresponding electronic image data; a controller responsive to the settings of the release switches and outputting either static image data or moving image data in real time; a first memory device for temporarily storing the static image data received from the controller; and a display unit for displaying either the static image corresponding to the static image data or the moving image corresponding to the moving image data, as determined by the controller.

15 Claims, 5 Drawing Sheets

DIGITAL STILL CAMERA WITH IMAGE PREVIEW USING A FIRST AND SECOND MEMORY AND METHOD FOR USING THE SAME

BACKGROUND OF THE INVENTION (a) Field of the Invention

The present invention relates to a digital still camera, and more particularly, to a digital still camera which allows previewing the composition of an image before the image is stored.

(b) Description of the Related Art

An electronic camera generally uses an image pickup device such as a color CCD (Charge Coupled Device) instead of a film when acquiring an image of an object. The output of the image pick-up device is converted into electrical signals which are recorded in a memory device. In a video camera, the memory device is a typically magnetic tape, and in a digital still camera, the memory device is typically an IC (Integrated Circuit) or a floppy disk.

The digital still camera has a photographic lens system and often uses Liquid Crystal Display (LCD) which displays either a still image of the object or a moving image in real time. A user can then view the static image or the moving image on the LCD.

When the image of an object is taken by either of the methods described above, a user knows the exact composition of the photographed image only after the corresponding image data, which are recorded in the memory device, are displayed on the LCD or on a computer monitor. If the user finds the composition of the photographed image unacceptable, the user must be able to delete the stored image data. The user can then take another image of the object until he is satisfied with the composition of the image.

SUMMARY OF THE INVENTION

It is an object of the present invention to provide a digital still camera and a method, where the composition of an image can be previewed before the image is recorded in the memory device.

The object of the invention is achieved by a digital still camera which includes at least two release switches. The digital still camera further includes a lens unit for capturing an optical image of the object; an image pickup unit for converting the optical image into corresponding electronic image data; a controller, responsive to the settings of the release switches, outputting either static image data or moving image data; a temporary memory device for temporarily storing the static image data received from the controller; and a display unit for displaying either the static image corresponding to the static image data or the moving image corresponding to the moving image data, as determined by the controller.

The method of the invention includes the steps of determining whether or not a first release switch is activated; if the first release switch is activated, storing the static image data in the temporary memory device, and displaying the static image on the display unit; or if the first release switch is not activated, deleting the static image data stored in the temporary memory device and displaying the moving image data in real time on the display unit.

BRIEF DESCRIPTION OF THE DRAWINGS

The above objects and features of the present invention will be apparent from the following description of the preferred embodiments with reference to the accompanying drawings.

DETAILED DESCRIPTION OF THE PREFERRED EMBODIMENTS

Reference will now be made in detail to the preferred embodiments of the present invention, examples of which are illustrated in the accompanying drawings.

A first preferred embodiment according to the present invention will be explained referring to FIGS. 1 and 2.

Figure 1:
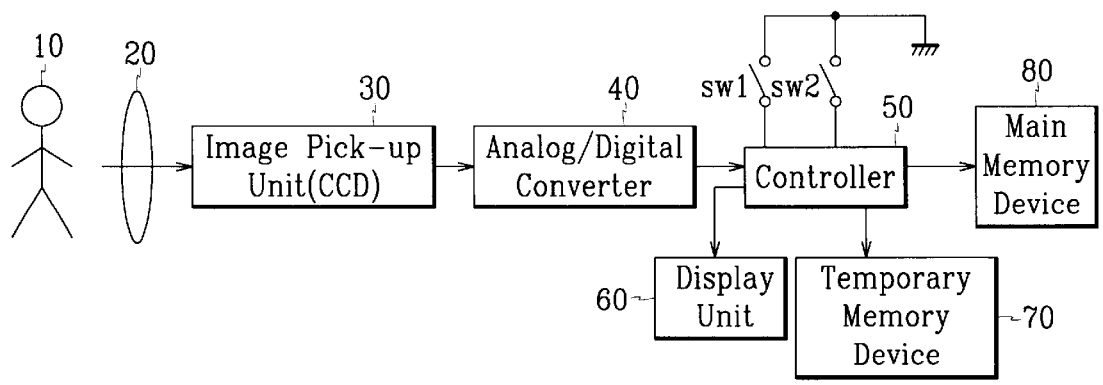
FIG. 1 is a block diagram of a controller of a digital still camera for previewing the composition of an image in accordance with a first embodiment of the present invention.

In FIG. 1, reference number 10 refers to an object and reference number 20 refers to a lens unit capturing the reflected-light image from the object 10.

Reference number 30 refers to an image pick-up unit (CCD) which receives the optical image captured by the lens unit 20 and generates electrical analog image signals corresponding to the optical image. Reference number 40 refers to an analog/digital converter which is connected to the output terminal of the image pick-up unit 30. The analog/digital converter 40 converts the analog image signals to digital image signals.

Reference number SW1 is a first release switch and SW2 is a second release switch. Both switches are operated by a user.

Reference number 50 refers to a controller. The controller 50 is connected to the output terminal of the analog/digital converter 40 and to output terminals of the first and second release switches SW1 and SW2.

Reference number 60 refers to a display unit, such as a LCD, which is connected to a first output terminal of the controller 50 and displays either a static image or a moving image in real time.

Reference number 70 refers to a temporary memory device which is connected to a second output terminal of the controller 50 and which temporarily stores static image data received from the controller 50. Reference number 80 refers to a main memory device which is connected to a third output terminal of the controller 50 and which stores compressed static image data after compression by the controller 50.

Figure 2:
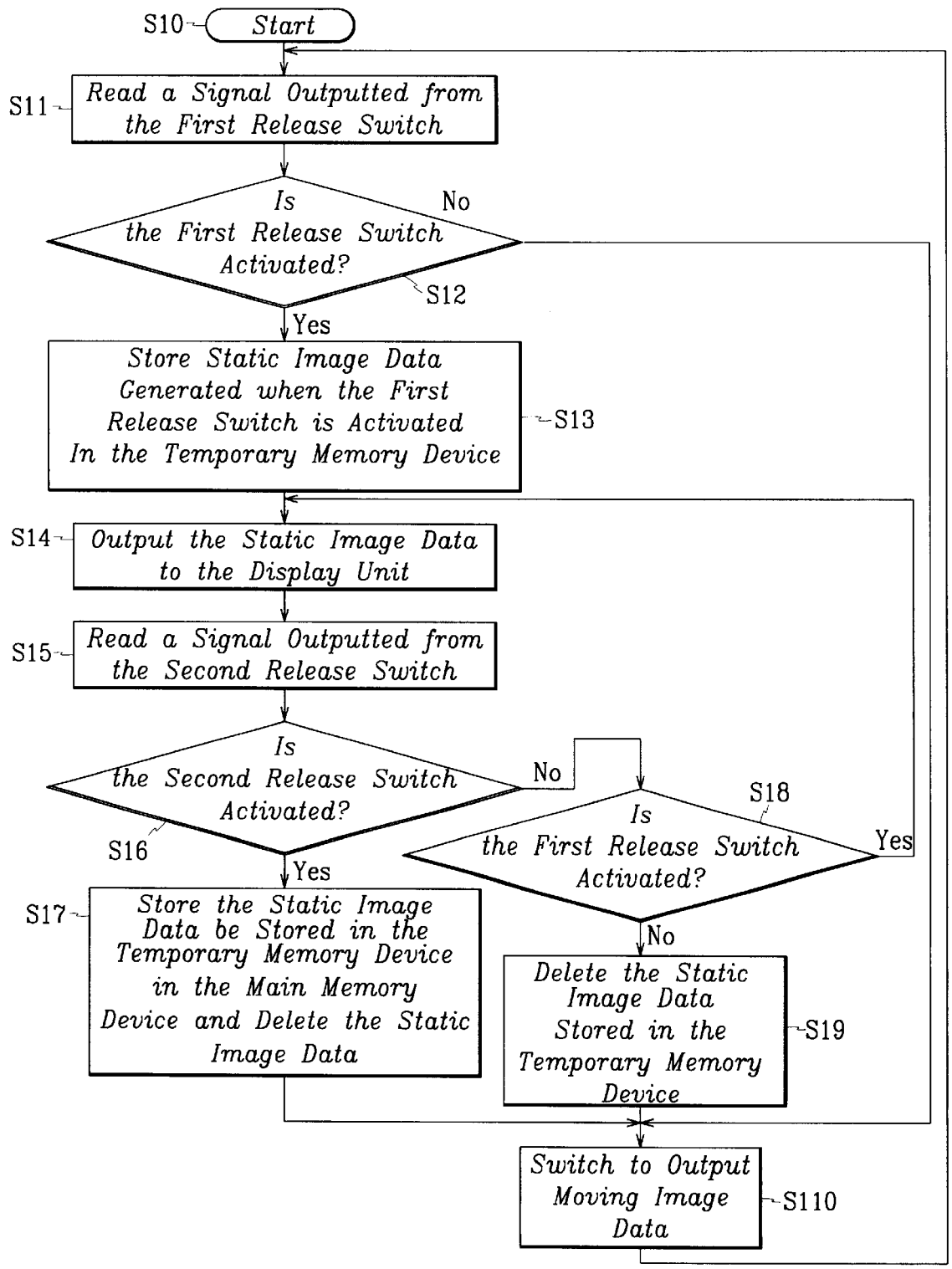
FIG. 2 is a flow chart illustrating a method for previewing the composition of the image of FIG. 1.

Referring now also to FIG. 2, the digital still camera according to the first embodiment of the present invention operates follows:

The controller 50 initializes a digital still camera in step S10 and reads a signal outputted from the first release switch SW1 to determines its state, i.e., if the switch SW1 has been activated by the user or not, steps S11 and S12.

A high level signal H received by the controller 50 from the first release switch SW1 indicates that the first release switch SW1 is not activated, in which case the controller 50 stops the output of the static image data to the display unit 60 and switches to output the moving image data in real time. The static image data correspond to the static image which is acquired when the first release switch SW1 is activated.

Conversely, a low level signal L received by the controller 50 from the first release switch SW1 indicates that the first release switch SW1 is activated by the user, in which case the controller 50 controls the exposure conditions (focusing, exposure settings) (not shown) of the digital still camera. When the first release switch SW1 is activated, the static image is captured and converted into the static image data. The static image data are inputted into the analog/digital converter 40; the converted digital data are then sent to the controller 50 which in turn outputs the data to both a temporary memory device 70 for storage and to the display unit 60 for previewing, step S13.

If the first release switch SW1 is activated, the static image is displayed on the display unit 60; the user can then preview a composition of the static image (step S14) before the image is stored in a main memory device 80. If the user finds the composition of the static image displayed on the display unit 60 acceptable, the user activates the second release switch SW2 to record the displayed static image in the main memory device 80.

If, on the other hand, the user finds the composition of the static image unacceptable, the user can release the first release switch SW1. The display unit 60 will then again display the moving image, step S110.

The controller 50 then reads a signal outputted from the second release switch SW2, and determines whether or not the second release switch SW2 is activated by the user, steps S15 and S16.

A low level L received from the second release switch SW2 by the controller 50 indicates that the second release switch SW2 is activated by the user. The controller 50 then compresses the static image data recorded in the temporary memory device 70 and stores the compressed static image data in the main memory device 80. The controller 50 also deletes the static image data which are recorded the temporary memory device 70, step S17.

Conversely, when the second release switch SW2 is not activated by the user, the controller 50 outputs the static image data which are recorded in the temporary memory device 70, to the display unit 60. In the default setting, i.e. when the first release switch SW1 and the second release switch SW2 are not activated, the display unit 60 displays the static image corresponding to the static image data.

In step S18, the controller 50 detects if the first release switch SW1 is released again after being activated, in which case the controller 50 deletes the static image data recorded in the temporary memory device 70, step S19, and stops the output of the static image data to the display unit 60, step S110 The controller 50 then outputs to the display unit 60 the moving image data instead of the static image data.

However, if the release switch SW1 is activated in step S18, the controller 50 outputs to the display unit 60 the static image data recorded in the temporary memory device 70.

The user can then preview the composition of the static image and if he finds the composition of the static image acceptable, record the displayed static image in the main memory device by activating the second release switch SW2.

Figure 3:
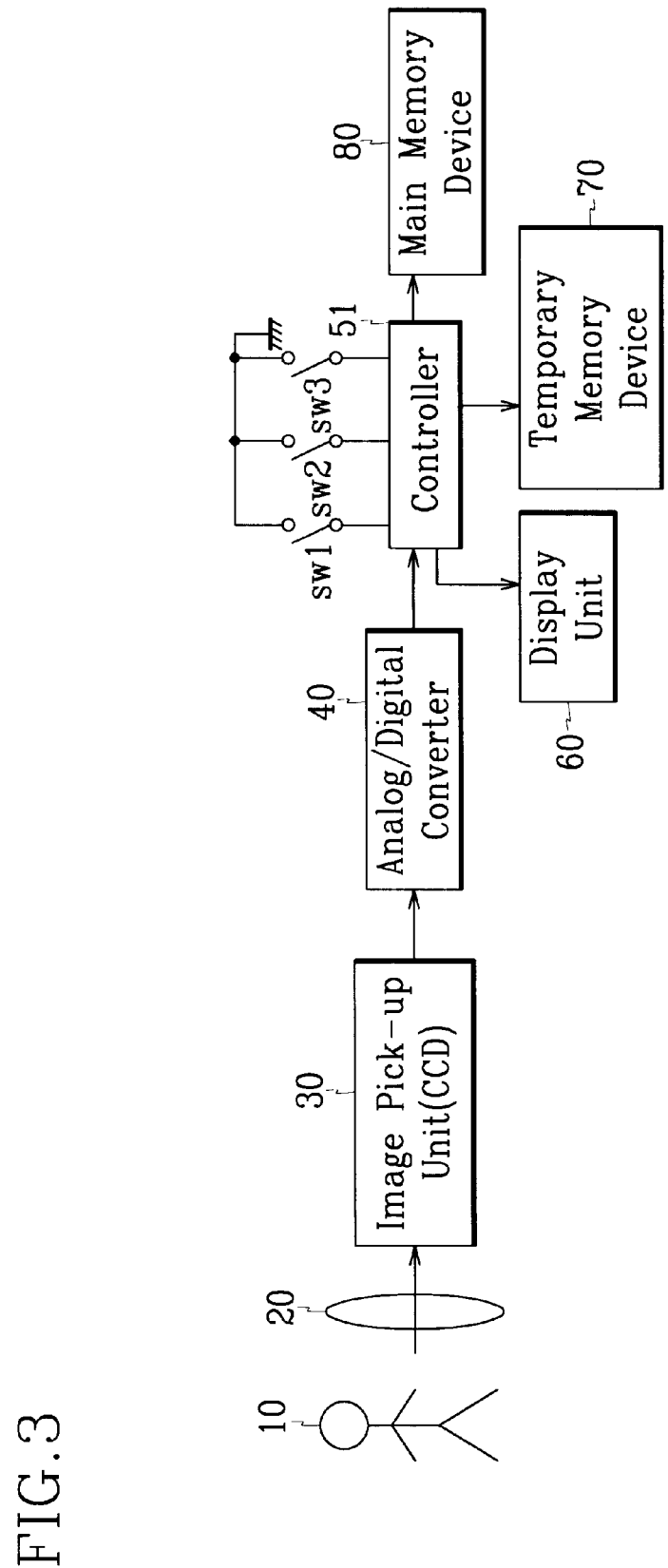
FIG. 3 is a block diagram of the controller of the digital still camera for previewing the composition of an image in accordance with a second embodiment of the present invention.
Figure 4A:
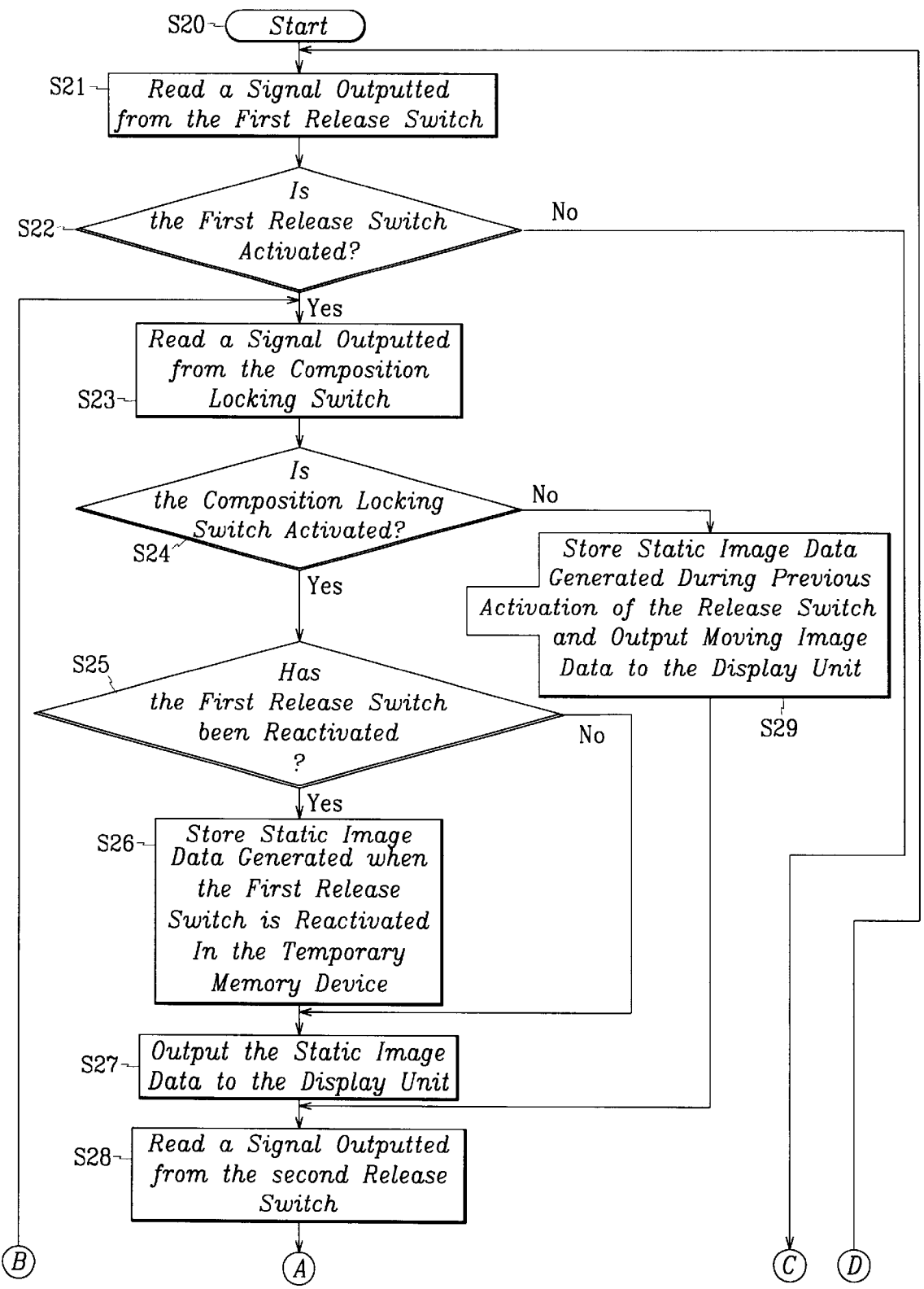
FIGS. 4A and 4B are flow charts illustrating a method for previewing the composition of the image of FIG. 3.
Figure 4B:
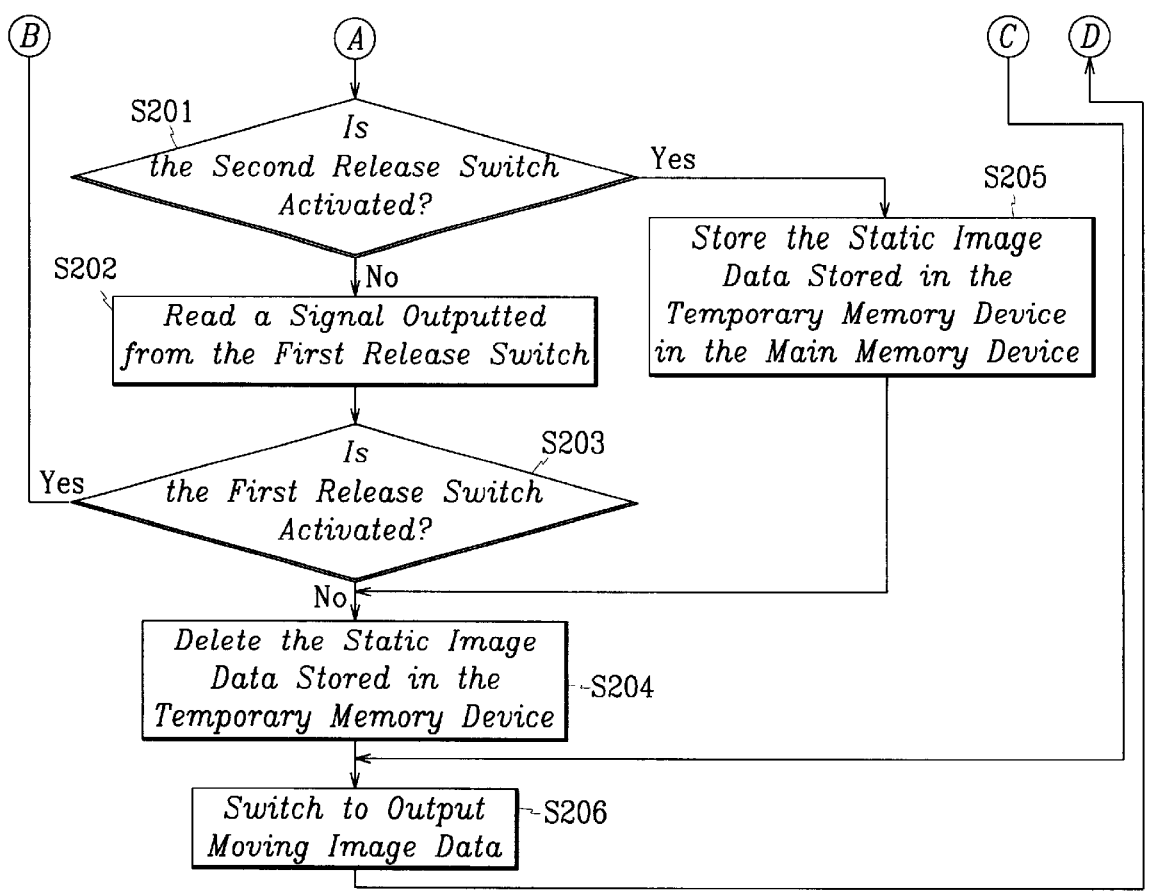

FIGS. 3 and 4 illustrate a digital still camera according to the second embodiment of the present invention.

As shown in FIG. 3, a control apparatus of a digital still camera capable of previewing a composition of a photograph in accordance with the second preferred embodiment of the present invention This camera has similar features s as the camera of the first embodiment of FIG. 1, expect for an additional composition locking switch SW3 which is connected to the controller 51 of FIG. 3.

The camera in accordance with the second embodiment of the present invention operates as follows:

A controller 51 initializes the digital still camera in step S20 and reads a signal outputted from the first release switch SW1 to determine its state, i.e., if the switch SW1 has been activated by the user or not, steps S21 and S22.

A high level signal H received by the controller 51 from the first release switch SW1 indicates that the first release switch SW1 is not activated, in which case the controller 51 outputs to the display unit 60 the moving image data instead of the static image data.

Conversely, a low level signal L received by the controller 51 from the first release switch SW1 indicates that the first release switch SW1 has been activated, in which case the controller 51 controls the exposure conditions (focusing, exposure settings) (not shown) of the digital camera . The controller 51 also reads a signal outputted from the composition locking switch SW3 to determine its status, i.e., whether or not the composition locking switch SW3 is activated, steps S23 and S24.

If the composition locking switch SW3 is activated, the controller 51 controls the digital still camera to output a static image on the display unit 60 while the first release switch SW1 is activated.

Also, the controller 51 determines whether or not status of the first release switch SW1 has changed, i.e., whether the first release switch SW1 has been deactivated or reactivated, because such change could have changed the static image data recorded in the temporary memory device 70, step S25.

If the controller 51 determines that the first release switch SW1 has been reactivated while the composition locking switch SW3 is activated, then the controller 51 stores the new static image data, captured after reactivation of release switch SW1, in the temporary memory device 70 and also outputs the new static image data to the display unit 60, steps S26 and S27.

The user can thus preview the composition of the new static image before the image new static image is recorded in the main memory device 80.

If the status of the first release switch SW1 is unchanged, step S25, then the static image also did not change and the controller 51 outputs to the display unit 60 the static image data recorded in the temporary memory 70.

Accordingly, with the composition locking switch SW3 activated, the controller 51 can output to the display unit 60 either the previous static image data or, alternatively, the new static image data depending on whether the first release switch SW1 has been reactivated or not.

If the user finds the composition of the displayed static image acceptable, he activates the second release switch SW2 to record the static image in the main memory device 80. Conversely, if the user finds the composition of the static image unacceptable, there is no need to store the static image in main memory 80. Accordingly, the controller 51 reads the signal outputted from the second release switch SW2, step S28, and determines whether or not the second release switch SW2 is activated, step S201.

If the composition locking switch SW3 is deactivated, step S24, the digital camera of the second embodiment operates like that of the first embodiment. The controller 51 then outputs to the display unit 60 the moving image, step S29; the controller 51 also determines whether or not the second release switch SW2 is activated, steps S28 and S201.

A low level signal L received by the controller 51 from the second release switch SW2 indicates that the second release switch SW2 is activated in which case the controller 51 compresses the static image data recorded in the temporary memory device 70 and transfers the compressed static image data to the main memory device 80. The static image data recorded in the temporary memory device 70 are subsequently deleted, steps S204 and S205.

Conversely, if the second release switch SW2 is not activated, the controller 51 continues to output to the display unit 60 the static image data recorded in the temporary memory device 70. The displayed static image corresponds to the image data obtained when the first release switch SW1 was activated. The controller 50 determines in step S202 whether or not the first release switch SW1 is activated.

If the first release switch SW1 is deactivated, the static image data recorded in the temporary memory device 70 are deleted, step S204, and are no longer transmitted to the display unit 60, step S206. The display unit 60 then displays a moving image.

Conversely, if the first release switch SW1 is activated, step S203, the controller 51 returns to step S23 and reads the signal outputted by the composition locking switch SW3, step S23.

With a digital still camera of the present invention, the user can preview and select a preferred composition of an image before recording the image in the main memory device, saving time and money.

Furthermore, the user can make more efficient use of the memory device because only acceptable images are recorded.

The camera is also more convenient to operate because the user can "lock" an acceptable image and store that image in the main memory device by activating the composition locking switch.

While it has been shown and described what are at present considered the preferred embodiments of the invention, it will be obvious to those skilled in the art that various changes and modifications can by readily made therein without departing from the scope and sprit of the invention as defined by the appended claims.

What is claimed is:

1. An apparatus enabling a user to preview the composition of an electronically acquired image on a display device and to store image data of the image in a first memory device, the apparatus comprising:
    a first release switch and a second release switch, each of the first release switch and the second release switch having a switch setting selected by the user;
    a controller in response to the switch settings of the first release switch and the second release switch directing the image data to be displayed on the display device either as a moving image or as a static image,
    wherein data of the static image are stored in the first memory device when the first release switch is activated and the data of the static image stored in the first memory device are deleted from the first memory device when the first release switch is deactivated after the activation.

2. The apparatus of claim 1, further comprising:
    a second memory device for storing the static image data stored in the first memory device when the second switch is activated.

3. The apparatus of claim 1, further comprising:
    a third switch having a switch setting to select a preview function for the composition of the image.

4. The apparatus of claim 2, wherein while the third switch is in an activated mode, the controller determines whether or not the first release switch is deactivated after activation, and if the first release switch is subsequently reactivated, stores new static image data in the first memory device.

5. The apparatus of claim 2, wherein when the third switch is deactivated, the controller outputs the data of the moving image to the display device.

6. An apparatus enabling a user to preview the composition of an electronically acquired image on a display device and to store image data of the image in a first memory device, the apparatus comprising:
    a first release switch and a second release switch, each of the first release switch and the second switch having a switch setting selected by the user;
    a controller in response to the switch settings of the first release switch and the second release switch directing the image data to be displayed on the display device either as a moving image or as a static image, wherein data of the static image are stored in the first memory device when the first release switch is activated and the data of the static image stored in the first memory device are deleted from the first memory device when the first release switch is deactivated after the activation, and wherein when the first release switch is activated, the controller outputs the data of the static image stored in the first memory device to the display device, and outputs the data of the moving image to the display device after the first switch is deactivated after the activation.

7. The apparatus of claim 1, wherein when both the first release switch and the second release switch are deactivated; the controller deletes the static image data from the first memory and outputs the moving image data to the display device.

8. A method enabling a user to preview the composition of an electronically acquired image on a display device and to store image data of the image in a memory device, the method comprising the steps of:
    determining a switch setting of a first release switch of at least two switches;
    displaying the image data on the display device either as a moving image or as a static image in response to the switch setting of the first release switch; and
    storing and deleting the image data stored in the memory device in response to the switch setting of the first release switch.

9. The method of claim 8, further comprising the steps of:
    determining whether or not the first release switch is reactivated following the activation of a third switch; and
    when the first release switch is reactivated, storing in the memory device new static image data generated.

10. The method of claim 8, further comprising the step of:
    outputting the moving image data to the display device when the third switch is not activated.

11. The method of claim 8, further comprising the steps of:
    determining whether or not a second release switch is activated; and
    when the second release switch is activated, storing the static image data which are stored in the memory device, in a second memory device, and deleting the static image data from the memory device.

12. A digital still camera, comprising:

an imaging unit for acquiring an image and converting the image into digital image data;

a first memory device and a second memory device for storing the image data;

a first release switch and a second release switch, each of the first release switch and the second release switch having a switch setting; and a controller receiving the switch settings and in response to the switch settings directing the image data to be displayed on the display device either as a moving image or as a static image, and to be stored in and deleted from the first memory device;

wherein the image data stored in the first memory are transferred to the second memory when the second release switch is activated.

13. The digital still camera of claim 12, further comprising:

a third switch for selecting a preview function for the composition of the image.

14. The digital still camera of claim 13, wherein the moving image is displayed on the display device when the third switch is not activated.

15. The digital still camera of claim 12, wherein the controller determines whether or not the first release switch is reactivated following the activation of a third switch; and wherein new static image data are stored in the first memory when the first release switch is reactivated.

* * * * *